(12) United States Patent
Liu et al.

(10) Patent No.: US 10,573,173 B2
(45) Date of Patent: Feb. 25, 2020

(54) VEHICLE TYPE IDENTIFICATION METHOD AND DEVICE BASED ON MOBILE PHONE DATA

(71) Applicants: SHANDONG PROVINCIAL COMMUNICATIONS PLANNING AND DESIGN INSTITUTE, Jinan, Shandong (CN); TSINGHUA UNIVERSITY, Beijing (CN)

(72) Inventors: Wei Liu, Jinan (CN); Weiling Wu, Jinan (CN); Kai Zhao, Beijing (CN); Yong Li, Beijing (CN); Depeng Jin, Beijing (CN); Tao Mu, Jinan (CN); Yiwu Li, Jinan (CN); Yufeng Bi, Jinan (CN); Jianhui Zheng, Jinan (CN); Ying Chang, Jinan (CN); Xiaobin Xu, Jinan (CN); Xiaoming Shao, Jinan (CN)

(73) Assignees: SHANDONG PROVINCIAL COMMUNICATIONS PLANNING AND DESIGN INSTITUTE, Jinan (CN); TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 16/322,095

(22) PCT Filed: Mar. 28, 2018

(86) PCT No.: PCT/CN2018/080945
§ 371 (c)(1),
(2) Date: Jan. 30, 2019

(87) PCT Pub. No.: WO2019/001044
PCT Pub. Date: Jan. 3, 2019

(65) Prior Publication Data
US 2019/0180610 A1    Jun. 13, 2019

(30) Foreign Application Priority Data
Jun. 29, 2017 (CN) .......................... 2017 1 0517910

(51) Int. Cl.
*G08G 1/01* (2006.01)
*G06N 20/20* (2019.01)
(Continued)

(52) U.S. Cl.
CPC ........... *G08G 1/012* (2013.01); *G06K 9/6256* (2013.01); *G06K 9/6267* (2013.01); *G06N 20/20* (2019.01);
(Continued)

(58) Field of Classification Search
CPC ...... G08G 1/012; G08G 1/0133; G08G 1/015; H04W 4/029; H04W 4/023; H04W 4/027;
(Continued)

(56) References Cited

U.S. PATENT DOCUMENTS 9,451,077 B2 * 9/2016 Duvaut ............ H04M 1/72577
9,558,664 B1 * 1/2017 Gaebler ............ G01C 21/3492
(Continued)

FOREIGN PATENT DOCUMENTS

| CN | 101136141 A | 3/2008 |
|---|---|---|
| CN | 104008576 A | 8/2014 |
| CN | 107463940 A | 12/2017 |

OTHER PUBLICATIONS

Abstract of Bai, Yu, "Identifying Travel Mode Using GPS Based Travel Survey Data," China Master's Theses Full-Text Database, Sep. 15, 2016.
(Continued)

*Primary Examiner* — Zhen Y Wu
(74) *Attorney, Agent, or Firm* — Oliff PLC

(57) ABSTRACT

A vehicle type identification method and device based on mobile phone data for solving the problem of providing a
(Continued)

convenient and low-cost vehicle type identification method. The method includes: obtaining trajectory data recorded by a mobile phone of a user within a period of time; judging mobile phone users who are on the same vehicle according to the data, and obtaining a vehicle trajectory and the number of passengers corresponding to the vehicle trajectory; obtaining a vehicle origin and destination according to the vehicle trajectory, and obtaining an origin-destination type of the vehicle trajectory in combination with geographic data; obtaining vehicle driving data according to the vehicle trajectory; and obtaining service area data of vehicle staying according to the vehicle trajectory. The cost of obtaining data by using mobile phone big data and by using mobile phone signaling data collected and provided by an operator is low.

18 Claims, 1 Drawing Sheet

(51) Int. Cl.
  *G08G 1/015*  (2006.01)
  *H04W 4/029*  (2018.01)
  *G06K 9/62*   (2006.01)
  *H04W 4/02*   (2018.01)
(52) U.S. Cl.
  CPC ............ *G08G 1/015* (2013.01); *G08G 1/0133* (2013.01); *H04W 4/029* (2018.02); *H04W 4/023* (2013.01); *H04W 4/027* (2013.01)
(58) Field of Classification Search
  CPC ..... H04W 4/046; G06N 20/20; G06K 9/6256; G06K 9/6267

USPC ......................................................... 340/933
See application file for complete search history.

(56) References Cited

U.S. PATENT DOCUMENTS

| | | | | |
|---|---|---|---|---|
| 9,763,055 | B2* | 9/2017 | Fan | G06F 3/0484 |
| 9,786,177 | B2* | 10/2017 | Ayvaci | G06K 9/00805 |
| 9,801,027 | B2* | 10/2017 | Levy | G08G 1/0112 |
| 9,900,747 | B1* | 2/2018 | Park | H04W 4/029 |
| 10,270,642 | B2* | 4/2019 | Zhang | H04L 27/362 |
| 2008/0054072 | A1* | 3/2008 | Katragadda | G08G 1/123 |
| | | | | 235/384 |
| 2011/0208429 | A1* | 8/2011 | Zheng | G01C 21/3484 |
| | | | | 701/533 |
| 2016/0174049 | A1* | 6/2016 | Levy | G08G 1/0112 |
| | | | | 455/456.5 |
| 2016/0232898 | A1* | 8/2016 | Rodriguez | G06T 7/00 |
| 2017/0052538 | A1* | 2/2017 | Li | H04B 17/3913 |
| 2017/0053461 | A1* | 2/2017 | Pal | H04W 4/029 |
| 2017/0103654 | A1* | 4/2017 | Gaebler | G01C 21/3492 |
| 2018/0053405 | A1* | 2/2018 | de Azevedo | G08G 1/0133 |
| 2019/0287388 | A1* | 9/2019 | Salti | G01S 19/52 |

OTHER PUBLICATIONS

Song, Lu, "Research on Traffic Origin-Destination Distribution Based on Cell Phone Data," China Master's Theses Full-Text Database, Aug. 15, 2016, pp. 1-77.
Jun. 27, 2018 International Search Report issued in International Patent Application No. PCT/CN2018/080945.
Jun. 27, 2018 English language Written Opinion issued in International Application No. PCT/CN2018/080945.

* cited by examiner

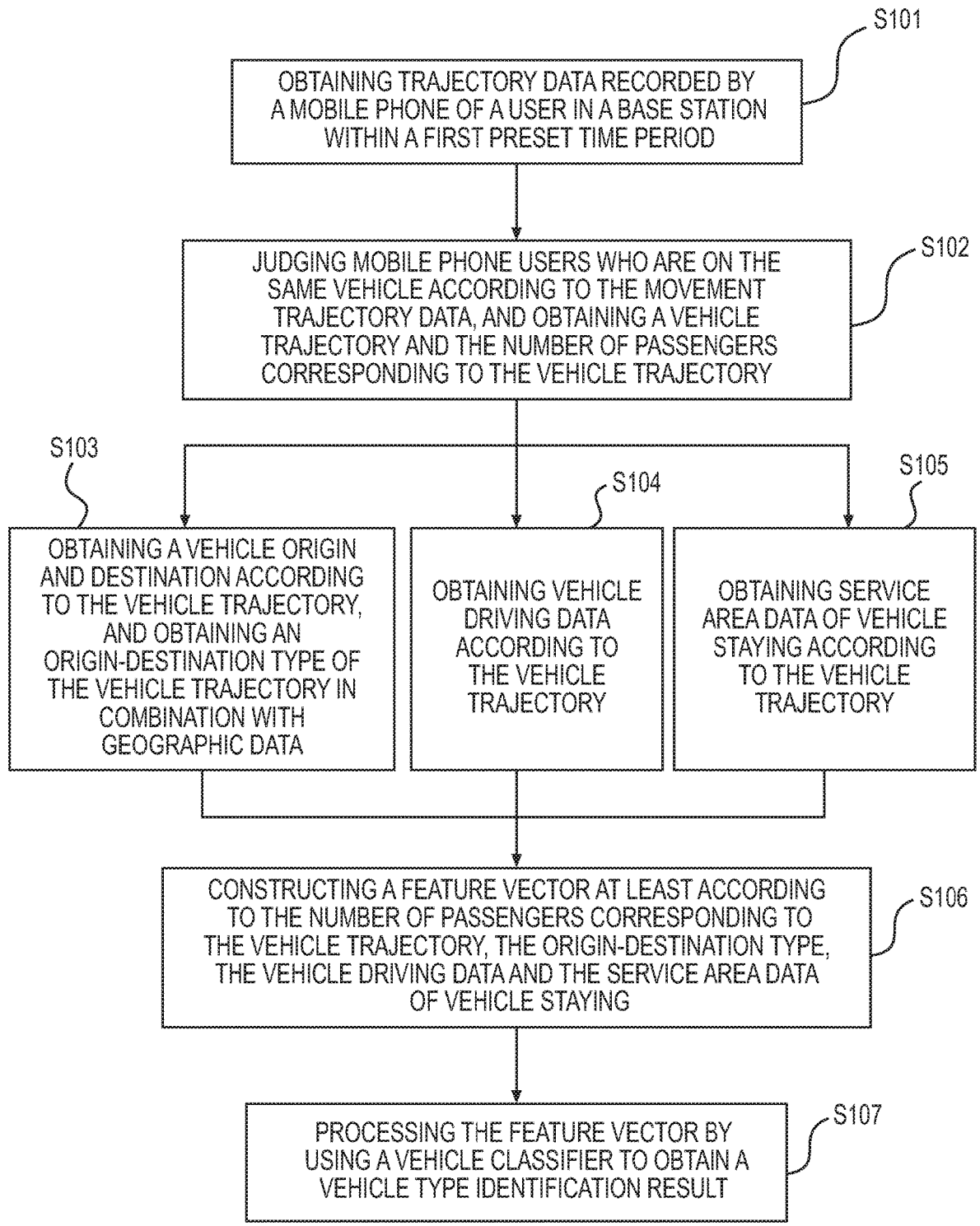

VEHICLE TYPE IDENTIFICATION METHOD AND DEVICE BASED ON MOBILE PHONE DATA

FIELD OF THE INVENTION

The present invention relates to the computer technology, and in particular to a vehicle type identification method and device based on mobile phone data.

BACKGROUND OF THE INVENTION

An intelligent transportation system is a system that effectively combines and applies the computer technology, the communication technology and the control technology to the transportation management, can manage the traffic in real time, accurately and efficiently, and is the main direction of traffic development in the 21st century. The automatic identification and type detection of vehicles is an important part of the intelligent transportation system, which can greatly improve the efficiency of the traffic management and provide an important reference for transportation planning.

At present, the mainstream vehicle identification methods at home and abroad can be divided into two major categories, namely, invasive classification methods and non-invasive identification methods. The intrusive detection technology requires the installation of sensors under road surfaces, such as pneumatic tubes, loop detectors, magnetic sensors and piezoelectric sensors or the like. When a vehicle passes by, the sensor can collect corresponding information, such as a vehicle speed, a vehicle weight, a body length and the like, so as to judge the type of vehicle. The disadvantages of this type of methods are short service lives and inconvenient installation. The non-intrusive methods mainly include installing sensors beyond the roads, such as radars, infrared sensors, acoustic sensors and cameras. Information such as body contour, height and wheelbase is received to classify the vehicle. The advantages of this type of methods are that the identification efficiency is high, but the cost of large-scale deployment is high. With the development of the image processing technology, the method of identifying a vehicle model by analyzing an image in a video signal grows at the highest speed in recent years, and the accuracy rate is also the highest. However, its relatively large drawback is that the installation cost is relatively high and is greatly affected by the weather.

Therefore, it is necessary to provide a convenient and low-cost vehicle identification method.

SUMMARY OF THE INVENTION

In view of the above problems, the present invention proposes a vehicle type identification method and device based on mobile phone data for overcoming the above problems or at least partially solving the above problems.

To this end, in a first aspect, the present invention provides a vehicle type identification method based on mobile phone data, and optionally, the method includes the following steps:

obtaining trajectory data recorded by a mobile phone of a user within a period of time;

judging mobile phone users who are on the same vehicle according to the trajectory data, and obtaining a vehicle trajectory and the number of passengers corresponding to the vehicle trajectory;

obtaining a vehicle origin and destination according to the vehicle trajectory, and obtaining an origin-destination type of the vehicle trajectory in combination with geographic data;

obtaining vehicle driving data according to the vehicle trajectory;

obtaining service area data of vehicle staying according to the vehicle trajectory;

constructing a feature vector at least according to the number of passengers corresponding to the vehicle trajectory, the origin-destination type, the vehicle driving data and the service area data of vehicle staying; and processing the feature vector by using a vehicle classifier to obtain a vehicle type identification result;

wherein the vehicle classifier is a vehicle classifier obtained by training via a machine learning method and the feature vector of a sample.

Optionally, judging mobile phone users who are on the same vehicle according to the trajectory data, and obtaining a vehicle trajectory and the number of passengers corresponding to the vehicle trajectory includes:

if a time coincidence degree of the trajectory of passing by a first geographic location and a second geographic location is greater than a first time coincidence degree, indicating that the first geographic location and the second geographic location have an intersection; dividing the trajectory data into sets one by one according to different first geographic locations and second geographic locations; and calculating the matching degrees between the trajectories in the sets one by one, if the trajectory is matched, indicating that the trajectory belongs to the passenger on the same vehicle, and then determining the trajectory and the number of passengers corresponding to the vehicle trajectory.

Optionally, the origin-destination type includes a residential area, an industrial area, a commercial area, a scenic spot, an entertainment area and a bus station.

Optionally, the obtaining vehicle driving data according to the vehicle trajectory includes:

calculating a set of time intervals $(t_s^{un}, t_e^{un})$ in which the speed is less than a first speed $V_{un}$ according to all vehicle trajectories;

calculating the number of vehicle trajectories overlapped at a third geographic location within a certain time interval $(t_s^{un}, t_e^{un})$; when the number of vehicle trajectories overlapped at the third geographic location is greater than a traffic jam threshold, determining the occurrence of a traffic jam within the period of time, and obtaining a traffic jam sub-trajectory, wherein the third location does not include the service area; and calculating a service area sub-trajectory, which is located in the service area and the vehicle speed is less than a second speed $V_{sa}$ in the vehicle trajectory according to the geographic location information of the service area, and calculating one or more driving data including an average speed, the maximum speed, a speed standard deviation and speed distribution of the vehicle according to the vehicle trajectory after the service area sub-trajectory and the traffic jam sub-trajectory are deducted.

Optionally, the service area data includes: a service area staying count, a total service area staying time and an average staying time in each service area.

Optionally, the machine learning method is a random forest method.

In a second aspect, the present invention provides a computer readable storage medium, storing a computer program thereon, wherein the program implements the steps of any of the methods described above when being executed by a processor.

In a third aspect, the present invention provides a computer device, including a memory, a processor, and a computer program stored on the memory and executable on the processor, wherein the processor implements the steps of any of the methods described above when executing the program.

It can be seen from the above technical solutions that the cost of obtaining data by using mobile phone big data and by using mobile phone signaling data collected and provided by an operator proposed by the present invention is low. The mobile phone signaling data cover almost all intercity peer users, so the user coverage is high, and the finally calculated and output intercity traffic travelling data are more trustworthy. The trajectory corresponding to the mobile phone signaling data is continuous, the time span of the obtained mobile phone signaling data is long, and the spatial coverage is wide, therefore the obtained mobile phone signaling data can also be used for studying historical highway vehicle types beside being used for studying the current highway vehicle types, in order to study the requirements of people for highways of different areas.

Brief summary contents of the understanding of some aspects of the present invention are provided above. This section is neither detailed description nor exhaustive description of various embodiments of the present invention. It is not intended to identify key or critical features of the present invention, nor to limit the scope of the present invention, but provide selected principles of the present invention in a simplified form to serve as the description of more detailed description given below. It should be understand that one or more features illustrated above or specifically described below are singly used or are combined for use, and the other embodiments of the present invention are possible.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other accompanying drawings can be obtained by those of ordinary skill in the art without any creative effort.

FIG. 1 is a schematic flow diagram of an execution method in an embodiment of the present invention.

DETAILED DESCRIPTION OF THE EMBODIMENTS

The present invention will be described below in connection with exemplary embodiments.

In an embodiment of the present invention, a vehicle type identification method based on mobile phone data is used for judging whether a vehicle on a highway is an automobile type, a passenger car, a bus or a truck, and the method includes the following steps:

S101: obtaining trajectory data recorded by a mobile phone of a user within a period of time;

S102: judging mobile phone users who are on the same vehicle according to the trajectory data, and obtaining a vehicle trajectory and the number of passengers corresponding to the vehicle trajectory;

S103: obtaining a vehicle origin and destination according to the vehicle trajectory, and obtaining an origin-destination type of the vehicle trajectory in combination with geographic data;

S104: obtaining vehicle driving data according to the vehicle trajectory;

S105: obtaining service area data of vehicle staying according to the vehicle trajectory;

S106: constructing a feature vector at least according to the number of passengers corresponding to the vehicle trajectory, the origin-destination type, the vehicle driving data and the service area data of vehicle staying; and S107: processing the feature vector by using a vehicle classifier to obtain a vehicle type identification result;

wherein the vehicle classifier is a vehicle classifier obtained by training via a machine learning method and the feature vector of a sample.

It can be seen from the above technical solutions that the cost of obtaining data by using mobile phone big data proposed by the present invention, that is, using mobile phone signaling data collected and provided by an operator is low. The mobile phone signaling data cover almost all intercity peer users, so the user coverage is high, and the finally calculated and output intercity traffic travelling data are more trustworthy. The trajectory corresponding to the mobile phone signaling data is continuous, the time span of the obtained mobile phone signaling data is long, and the spatial coverage is wide, therefore the obtained mobile phone signaling data can also be used for studying historical highway vehicle types beside being used for studying the current highway vehicle types, in order to study the requirements of people for highways of different areas.

The mobile phone of the user actually refers to a telephone card, that is, the mobile phone of the user is mainly distinguished by the telephone card used by the user, and the signs of different telephone cards correspond to different trajectory data in the base station. The trajectory data are composed of trajectories corresponding to a large number of users, the trajectory refers that the base station has the positioning data of the mobile phone after the mobile phone is connected to the base station, the positioning data have spatial domain features, for example, the trajectory data of a user a and a user b are respectively Ta={ $(t_1^a, l_1^a)$, $(t_2^a, l_2^a)$ . . . , $(t_m^a, l_m^a)$}, Tb={$(t_1^b, l_1^b)$, $(t_2^b, l_2^b)$ . . . , $(t_n^b, l_n^b)$}, wherein $t_x^i$ represents the moment of collecting $(t_x^i, l_x^i)$, $l_x^i$ represents the location information of the mobile phone of the user at the moment $t_x^i$, and $t_x^i > t_{x+1}^i$. In some embodiments, the code of the base station of the mobile phone can be used for representing the location of the mobile phone, that is, $l_x^i$ may be the serial number of the base station or a coverage area of the base station or mobile network positioning of the mobile phone.

Judging mobile phone users who are on the same vehicle according to the trajectory data, and obtaining a vehicle trajectory and the number of passengers corresponding to the vehicle trajectory includes:

if a time coincidence degree of the trajectory of passing by a first geographic location and a second geographic location is greater than a first time coincidence degree, indicating that the first geographic location and the second geographic location have an intersection; dividing the trajectory data into sets one by one according to different first geographic locations and second geographic locations; and the first geographic location and the second geographic location may be two points on a road, for example, a starting point and an end point of the road.

Taking the user a and the user b as an example to illustrate how to divide the trajectory data into the sets: it is assumed that there are two users a and b, the times of passing the starting point s and the end point e of the road according to the corresponding trajectories are respectively $(t_s^a, t_e^a)$, $(t_s^b, t_e^b)$, if the time coincidence degree between $(t_s^a, t_e^a)$ and $(t_s^b, t_e^b)$ is greater than a first time coincidence degree, then the user a and the user b may be on the same vehicle, the user a and the user b belong to the same set, or otherwise a and b are classified into different sets; the first time coincidence degree is a preset value, for example, 80% in one embodiment, and then whether the coincidence degrees between the $(t_s^a, t_e^a)$ and $(t_s^b, t_e^b)$) with (min $(t_s^a, t_s^b)$ and (max $(t_e^a, t_e^b)$)) are greater than 80% are respectively calculated.

In the step, the trajectories which are obviously not in the same vehicle are separated from each other into different sets, and the step simplifies the calculation amount of the matching degree between the trajectories in the subsequent calculations.

The matching degrees between the trajectories in the sets are calculated one by one, if the trajectory is matched, the trajectory belongs to the passenger on the same vehicle, and then the trajectory and the number of passengers corresponding to the vehicle trajectory are determined.

Whether two trajectories belonging to the same set are generated by users on the same vehicle is mainly judged according to the temporal and spatial coincidence degree of the trajectories. For example, in one embodiment of the present invention, the judgment of the temporal and spatial coincidence degree includes the following steps:

At first, a time intersection of two trajectories is taken, the time intersection may be initialized as (min $(t_s^a, t_s^b)$, max $(t_e^a, t_e^b)$), the trajectory data of the user a and the user b are complemented according to Ta={ $(t_1^a, 1_1^a), (t_2^a, 1_2^a) \ldots, (t_m^a, 1_m^a)$}, Tb={ $(t_1^b, 1_1^b), (t_2^b, 1_2^b) \ldots, (t_n^b, 1_n^b)$} and (min($t_s^a, 1_s^b$), max($t_e^a, t_e^b$)), so that $(t_j^b, 1_j^b)$ corresponds to $t_i^a$, wherein to $t_i^a = t_j^a$; and therefore, whether the user a and the user b are on the same vehicle can be judged by comparing a location sequence $\{1_1 \ldots 1_i \ldots 1_n'\}$ of Tb and the location sequence $\{1_1 \ldots 1_i \ldots 1_m'\}$ of Ta. In one embodiment, whether the user a and the user b are on the same vehicle is judged according to an average value of the Euclidean distance between corresponding points between the location sequence $\{1_1 \ldots 1_i \ldots 1_n'\}$ of Tb and the location sequence $\{1_1 \ldots 1_i \ldots 1_m'\}$ of Ta.

The trajectory data of the user a at the moment $t_i$ can be complemented by calculating geographic coordinates $1_i$ of the user a at the moment $t_i$ according to trajectory points $(t_{i-1}^a, 1_1^a)$ and $(t_{i+1}^a, 1_1^a)$ in the vicinity of the user at the moment $t_i$, the GPS accuracy and a road matching algorithm.

If the trajectory data of a user x does not overlap with any other trajectory data in the set (i.e., it is judged that they are not overlapped through the location sequences), it is considered that the user x is on a vehicle alone. The sets are processed one by one until all vehicle trajectories are obtained, it may be understood that the trajectory of the vehicle is the trajectory of the user on the vehicle. If a plurality of users are on the vehicle, a relatively suitable vehicle trajectory may be obtained according to the calculation of the user trajectories. At this point, the trajectory of the vehicle is obtained by the trajectory of the user.

The origin-destination type includes a residential area, an industrial area, a commercial area, a scenic spot, an entertainment area and a bus station. The starting points (ls, le) of all trajectories are extracted, and the type of the location is obtained in combination with a map.

The starting point can take one of the following six types, and there are 36 situations in total. The starting points of different types of vehicles generally different from other each other greatly. For example, the starting point of a truck is generally an industrial area, and the starting point of a bus is generally a bus stop, so that the characteristics of the starting points are used in machine learning and may be used for identifying the type of the vehicle, that is, the type of vehicle may be distinguished by the type of the starting point. By extracting the origin-destination type of the trajectory, two matrices of the starting point and the end point may be obtained, and the two dimensions of the matrix are a trajectory serial number and a location type. A segment of trajectory may have multiple starting points (ls, le), and the multiple starting points (ls, le) divide the trajectory into several segments.

The obtaining vehicle driving data according to the vehicle trajectory includes: calculating a set of time intervals $(t_s^{un}, t_e^{un})$ in which the speed is less than a first speed $V_{un}$ according to all vehicle trajectories; calculating the number of vehicle trajectories overlapped at a third geographic location within a certain time interval $(t_s^{un}, t_e^{un})$; when the number of vehicle trajectories overlapped at the third geographic location is greater than a traffic jam threshold, determining the occurrence of a traffic jam within the period of time, and obtaining a traffic jam sub-trajectory, wherein the third location does not include the service area; and calculating a service area sub-trajectory, which is located in the service area and the vehicle speed is less than a second speed $V_{sa}$ in the vehicle trajectory according to the geographic location information of the service area, and calculating one or more driving data including an average speed, the maximum speed, a speed standard deviation and speed distribution of the vehicle according to the vehicle trajectory after the service area sub-trajectory and the traffic jam sub-trajectory are deducted.

On the highway, different types of vehicles have different speed limits, so speed characteristics are an important feature in our problems. Before calculating the speed characteristics, we also need to preprocess the data to eliminate the situation in which the vehicle stops moving, such as traffic jam, entry of the service area, etc.

In the case of the traffic jam, the speed set of all trajectory segments (the trajectory between two sampling moments) of the vehicle is calculated, all speed sets less than 40/km h are found, then smoothing processing is performed on these trajectory segments to find continuous period of time $(t_s^{un}, t_e^{un})$, the speed of the user is less than $V_{un}$ within the period of time, and the location of the vehicle is not in a service area collection. The same operation is performed on all users to obtain $(t_s^{un}, t_e^{un})$ corresponding to each segment of trajectory. When the number of overlapped vehicles within a certain period of time reaches a certain threshold, the traffic jam is judged. When the driving data are calculated, the trajectory of the period of time is deleted from these trajectories of the vehicles.

For the highway we want to study, we find all service area location sets Lservices=$\{1_{s1}, \ldots 1_{si} \ldots 1_{sk}\}$ in the highway at first, which contains K different service areas. The speed set V of all trajectory segments (the trajectory between the two sampling moments) of the vehicle is calculated, a trajectory in which the speed is less than the preset value, and the distance between the location and a point in the service area location set is less than the preset value is found, and when the driving data are calculated, the trajectory is deleted from the these trajectories of the vehicle.

When the driving data are calculated, one or more of the following list 1 can be selected for calculation:

TABLE 1 driving data table

| Feature | Description | Formula |
|---|---|---|
| $\bar{v}$ | Average speed | $\bar{v} = \dfrac{\sum_{v \in V'} v}{|V'|}$ |
| $v_{max}$ | Maximum speed | $v_{max} = \max v, (v \in V')$ |
| $s_v$ | Standard speed deviation | $s_v = \sqrt{\dfrac{\sum_{v \in V'}(v - \bar{v})^2}{|V'|}}$ |
| $v_{20\%}$ | Speed at 20% in speed distribution | $\dfrac{|\{v \mid v < v_{20\%}, v \in V'\}|}{|V'|} = 20\%$ |
| $v_{40\%}$ | Speed at 40% in speed distribution | $\dfrac{|\{v \mid v < v_{40\%}, v \in V'\}|}{|V'|} = 40\%$ |
| $v_{60\%}$ | Speed at 60% in speed distribution | $\dfrac{|\{v \mid v < v_{60\%}, v \in V'\}|}{|V'|} = 60\%$ |
| $v_{80\%}$ | Speed at 80% in speed distribution | $\dfrac{|\{v \mid v < v_{80\%}, v \in V'\}|}{|V'|} = 80\%$ |

When whether the trajectory includes the service area trajectory is calculated and judged, the service area data may also be calculated synchronously. The service area data includes: a service area staying count, a total service area staying time and an average staying time in each service area. A trajectory has k staying points, reference is made to related formulas in table 2, wherein $P_{service}^k$: represents the staying point of the vehicle in the kth service area, and the staying point set of the trajectory is marked as $P_{service} = \{P_{service}^1, P_{service}^2, \ldots, P_{service}^K\}$.

TABLE 2 service area data table

| Feature | Description | Formula |
|---|---|---|
| K | Service area staying count | K |
| $\tau_{service}$ | Total service area staying time | $\tau_{service} = \sum_{i=1}^{|P_{service}|} t_{i+1} - t_i$ |
| $\bar{\tau}_{service}$ | Average staying time in each service area | $\bar{\tau}_{service} = \dfrac{1}{K}\sum_{k=1}^{K}\sum_{i=1}^{|P_{service}^k|} t_{i+1} - t_i$ |

The machine learning method is a random forest method. When the sample data are constructed, training data corresponding to the sample trajectory of the vehicle are generated by using the following sufficient conditions, if a) the number of passengers on the vehicle is greater than 5; b) the starting point is the bus station, the vehicle is a bus; if a) the average speed exceeds 100 km/h and the starting point is the residential area or the entertainment area, then the vehicle is a passenger car; and if the a) average speed does not exceed 100 km/h and the starting point is the industrial area, the vehicle is a truck.

The present invention further provides a computer readable, storing a computer program thereon, wherein the program implements the steps of any of the methods described above when being executed by a processor.

The present invention further provides a computer device, including a memory, a processor, and a computer program stored on the memory and executable on the processor, wherein the processor implements the steps of any of the methods described above when executing the program.

As used herein, "at least one", "one or more", and "and/or" are open-ended expressions that may be combined and separated in use. For example, "at least one of A, B and C", "at least one of A, B or C", "one or more of A, B and C" and "one or more of A, B or C" means only A, only B, only C, A and B together, A and C together, B and C together or A, B and C together.

The term "an" entity refers to one or more of the entities. The terms "one", "one or more" and "at least one" are used interchangeable herein. It should also be noted that the terms "including", "comprising" and "having" are also used interchangeably.

The term "automatic" and variations thereof as used herein refer to any processing or operation that is performed without substantial human input when the processing or operation is executed. However, the processing or operation may be automatic even if substantial or insubstantial human input received prior to the execution of the processing or operation is used during the execution of the processing or operation. If the input affects how the processing or operation proceeds, then the input is considered to be substantial. The human input that does not affect the processing or operation is not considered to be substantial.

The term "computer readable medium" as used herein refers to any tangible storage device and/or transmission medium that participates in providing instructions for the processor for execution. The computer readable medium may be a serial instruction set encoded in network transmission (e.g., SOAP) on an IP network. Such medium may take many forms, including but not limited to, a non-volatile medium, a volatile medium and a transmission medium. The non-volatile medium includes, for example, an NVRAM or a magnetic disk or an optical disk. The volatile medium includes a dynamic memory such as RAM, such as a main memory. Common forms of computer readable medium include, for example, a floppy disk, a flexible disk, a hard disk, a magnetic tape or any other magnetic media, magneto-optical media, a CD-ROM, any other optical media, perforated cards, paper tape, any other physic media having perforated patterns, an RAM, a PROM, an EPROM, a FLASH-EPROM, solid state media such as storage cards, any other storage chips or tape cartridges, carriers described later, or any other media that may be read by a computer. A digital file attachment or other self-contained information files or file sets are considered as distribution media equivalent to the tangible storage media. When the computer readable medium is configured as a database, it should be understood that the database may be any type of database, such as a relational database, a hierarchical database, an object oriented database, and the like. Accordingly, the present invention is considered to include the tangible storage media or the distribution media and equivalents well known in the art, and media developed in the future, and the software implementation of the present invention is stored in these media.

The terms "determine," "operate," and "calculate," and variations thereof, as used herein, are used interchangeably and include any type of methods, processes, mathematical operations, or techniques. More specifically, such terms may include an interpretation rule or a rule language such as BPEL, wherein the logic is not hard coded but is represented in a rule file that can be read, interpreted, compiled and executed.

The term "module" or "tool" as used herein refers to any known or later developed hardware, software, firmware, artificial intelligence, fuzzy logic, or a combination of hardware and software capable of performing the functions associated with the component. In addition, although the present invention has been described in terms of the exemplary embodiments, it should be understood that various aspects of the present invention may be singly protected.

It should be noted that, in the context, relational terms such as first and second and the like are used merely to distinguish one entity or operation from another entity or operation, and do not necessarily require or imply that there is any such actual relationship or order between these entities or operations. Moreover, the terms "comprise," "include" or any other variations are intended to cover non-exclusive inclusion, so that a process, a method, an article or a terminal device including a series of factors not only include those factors, but also includes other factors that not obviously listed, or further includes inherent factors of the process, the method, the article or the terminal device. The factor defined by the phrase "comprising" or "including" does not exclude the presence of additional factors in the process, the method, the article or the terminal device including the factor, without further limitation. In addition, in the document, "greater than", "less than", "exceeded" and the like are understood as not including the present number; and "above", "below", "inside" and the like are understood as including the present number.

Although the above embodiments have been described, those skilled in the art may make other changes and modifications to these embodiments once knowing the basic inventive concepts, so the above descriptions are only the embodiments of the present invention, rather than limiting the protection scope of the patent of the present invention, any equivalent structures or equivalent process transformations made by using the contents of the specification and the drawings of the present invention, or direct or indirect application in other related technical fields are similarly encompassed within the protection scope of the patent of the present invention.

The invention claimed is:

1. A vehicle type identification method for use with mobile phone data, the vehicle type identification method comprising:
    obtaining, by a processor, trajectory data recorded by a mobile phone of a user within a period of time;
    judging, by the processor, mobile phone users who are on a same vehicle according to the trajectory data, and obtaining a vehicle trajectory and a number of passengers corresponding to the vehicle trajectory;
    obtaining, by the processor, a vehicle origin and destination according to the vehicle trajectory, and obtaining an origin-destination type of the vehicle trajectory in combination with geographic data;
    obtaining, by the processor, vehicle driving data according to the vehicle trajectory;
    obtaining, by the processor, service area data of vehicle staying according to the vehicle trajectory;
    constructing, by the processor, a feature vector including: (i) the number of passengers corresponding to the vehicle trajectory, (ii) the origin-destination type, (iii) the vehicle driving data, and (iv) and the service area data of vehicle staying; and
    processing, by the processor, the feature vector with a vehicle classifier to obtain a vehicle type identification result; wherein
    the vehicle classifier is a vehicle classifier obtained by training via a machine learning method and the feature vector of a sample.

2. The method according to claim 1, wherein judging mobile phone users who are on the same vehicle according to the trajectory data, and obtaining a vehicle trajectory and the number of passengers corresponding to the vehicle trajectory comprises:
    if a time coincidence degree of the trajectory of passing by a first geographic location and a second geographic location is greater than a first time coincidence degree, indicating that the first geographic location and the second geographic location have an intersection;
    dividing the trajectory data into sets one by one according to different geographic locations to produce a plurality of trajectories;
    calculating matching degrees between the plurality of trajectories in the sets one by one; and
    if one trajectory is matched based on the calculated matching degrees out of the plurality of trajectories, indicating that the one trajectory belongs to the passenger on the same vehicle, and then determining the trajectory and the number of passengers corresponding to the one vehicle trajectory.

3. The method according to claim 1, wherein the origin-destination type comprises a residential area, an industrial area, a commercial area, a scenic spot, an entertainment area and a bus station.

4. The method according to claim 1, wherein the obtaining vehicle driving data according to the vehicle trajectory comprises:
    calculating a set of time intervals $(t_s^{un}, t_e^{un})$ in which the speed is less than a first speed $V_{un}$ according to a plurality of vehicle trajectories;
    calculating a number of vehicle trajectories that are overlapped at a third geographic location within a certain time interval $(t_s^{un}, t_e^{un})$;
    when the number of vehicle trajectories overlapped at the third geographic location is greater than a traffic jam threshold, determining the occurrence of a traffic jam within the period of time, and obtaining a traffic jam sub-trajectory, wherein the third geographic location does not include the service area; and
    calculating a service area sub-trajectory, which is located in the service area and the vehicle speed is less than a second speed $V_{sa}$ in the vehicle trajectory according to the geographic location information of the service area, and calculating one or more driving data including an average speed, the maximum speed, a speed standard deviation and speed distribution of the vehicle according to the vehicle trajectory after the service area sub-trajectory and the traffic jam sub-trajectory are deducted.

5. The method according to claim 1, wherein the service area data comprises: a service area staying count, a total service area staying time and an average staying time in each service area.

6. The method according to claim 1, wherein the machine learning method is a random forest method.

7. A non-transitory computer readable storage medium, storing a computer program thereon, wherein the computer program implements the steps of the method according to claim 1 when being executed by a processor.

8. A computer device, comprising a memory, a processor, and a computer program stored on the memory and executable on the processor, wherein the processor implements the steps of the method according to claim 1 when executing the program.

9. A non-transitory computer readable storage medium, storing a computer program thereon, wherein the computer program implements the steps of the method according to claim 2 when being executed by a processor.

10. A non-transitory computer readable storage medium, storing a computer program thereon, wherein the computer program implements the steps of the method according to claim 3 when being executed by a processor.

11. A non-transitory computer readable storage medium, storing a computer program thereon, wherein the computer program implements the steps of the method according to claim 4 when being executed by a processor.

12. A non-transitory computer readable storage medium, storing a computer program thereon, wherein the computer program implements the steps of the method according to claim 5 when being executed by a processor.

13. A non-transitory computer readable storage medium, storing a computer program thereon, wherein the computer program implements the steps of the method according to claim 6 when being executed by a processor.

14. A computer device, comprising a memory, a processor, and a computer program stored on the memory and executable on the processor, wherein the processor implements the steps of the method according to claim 2 when executing the program.

15. A computer device, comprising a memory, a processor, and a computer program stored on the memory and executable on the processor, wherein the processor implements the steps of the method according to claim 3 when executing the program.

16. A computer device, comprising a memory, a processor, and a computer program stored on the memory and executable on the processor, wherein the processor implements the steps of the method according to claim 4 when executing the program.

17. A computer device, comprising a memory, a processor, and a computer program stored on the memory and executable on the processor, wherein the processor implements the steps of the method according to claim 5 when executing the program.

18. A computer device, comprising a memory, a processor, and a computer program stored on the memory and executable on the processor, wherein the processor implements the steps of the method according to claim 6 when executing the program.

* * * * *